United States Patent
Chavez et al.

(10) Patent No.: US 7,950,064 B2
(45) Date of Patent: May 24, 2011

(54) SYSTEM AND METHOD FOR CONTROLLING COMMENTS IN A COLLABORATIVE DOCUMENT

(75) Inventors: Timothy R. Chavez, Austin, TX (US); Jacob Daniel Eisinger, Austin, TX (US); Jennifer Elizabeth King, Austin, TX (US); William Alexander Reichert, III, Boston, MA (US); Patrick Ryan Wardrop, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 810 days.

(21) Appl. No.: 11/941,250

(22) Filed: Nov. 16, 2007

(65) Prior Publication Data

US 2009/0129596 A1    May 21, 2009

(51) Int. Cl.
    G06F 7/04    (2006.01)
(52) U.S. Cl. .......................................... 726/28; 715/234
(58) Field of Classification Search .................. 726/28, 726/2, 26, 27, 29, 30; 380/277, 286; 715/234
    See application file for complete search history.

(56) References Cited

U.S. PATENT DOCUMENTS

| | | | |
|---|---|---|---|
| 6,078,403 A * | 6/2000 | Palmer .......................... | 358/1.18 |
| 6,263,340 B1 | 7/2001 | Green ............................ | 707/102 |
| 6,438,564 B1 * | 8/2002 | Morton et al. ................ | 715/206 |
| 6,636,965 B1 * | 10/2003 | Beyda et al. .................. | 713/152 |
| 6,854,087 B1 | 2/2005 | Takeo et al. ................... | 715/526 |
| 7,194,679 B1 * | 3/2007 | Green ............................ | 715/233 |
| 7,689,570 B2 * | 3/2010 | Fuchs ............................ | 707/805 |
| 2006/0010095 A1 * | 1/2006 | Wolff et al. ..................... | 707/1 |
| 2007/0011606 A1 * | 1/2007 | Bagheri ......................... | 715/517 |

FOREIGN PATENT DOCUMENTS

| | | |
|---|---|---|
| JP | 07028816 | 7/1993 |
| JP | 10040236 | 7/1996 |

OTHER PUBLICATIONS

Neuwirth, CM. et al.; "Issues in the Design of Computer Support for Co-authoring and Commenting," ACM Digital Library, 1990.
Snowden, D. et al.; "Diffusing Information in Organizational Settings: Learning from Experience," ACM Digital Library, 2002.
Cadiz, JJ. et al.; "Using Web Annotations for Asynchronous Collaboration Around Documents," ACM Digital Library, 2000.
Leland, MDP. et al.; "Collaborative Document Production Using Quilt," ACM Digital Library, 1988.

* cited by examiner

*Primary Examiner* — Beemnet W Dada
(74) *Attorney, Agent, or Firm* — VanLeeuwen & VanLeeuwen; Justin M. Dillon (57) ABSTRACT

A system, method, and program product is provided that operates when opening a word processing document that includes document content inserted at various insertion points within the document. The document is opened by a user that corresponds to a particular user identifier. The comments included in the document include recipient identifiers. A first set of comments are selected where the user's identifier is included in the recipient identifiers of the corresponding comments, and a second set of comments are selected where the user's identifier is not included in the recipient identifiers of the corresponding comments. The word processor displays the first set of comments at their respective insertion points within the document content and does not present the second set of comments.

17 Claims, 9 Drawing Sheets

SYSTEM AND METHOD FOR CONTROLLING COMMENTS IN A COLLABORATIVE DOCUMENT

BACKGROUND OF THE INVENTION

1. Technical Field

The present invention relates to a system and method that controls comments in a collaborative document. More particularly, the present invention relates to a system and method that presents comments in a document to selected individuals as well as securing comments when needed.

2. Description of the Related Art

Documents (e.g., word processing documents) are an important form of communication and documentation. Because of their importance, the audience for a particular document may include many types of individuals. For example, a document may have more than one author and more than one reviewer. Each of these authors and reviews may have a different level of importance and scope regarding the document, and therefore some may be responsible for authoring or reviewing the entire document while others are concerned with particular sections. In addition, some individuals reviewing the document may be supervisors over other individuals that are authoring or reviewing the document. Because of the varied types of individuals authoring and reviewing a document, comments of a sensitive or confidential nature are often left out of traditional comments since such comments are visible to all users of the document.

One approach to providing comments only to selected individuals is to send the comments via another media, such as in a separate email note. The obvious challenge of this approach is that the comments included in a separate email note are disconnected from the actual document making it difficult to determine where the comment applies. Another challenge of this approach is that the email-based comment does not run with the lifecycle of the document, so authors and reviews have a more difficult time assessing whether the comment was adequately addressed in further drafts.

SUMMARY

It has been discovered that the aforementioned challenges are resolved using a system, method and computer program product that operates when opening a word processing document that includes document content and comments inserted at various insertion points within the document content. The document is opened by a user that corresponds to a particular user identifier. The comments included in the document include one or more recipient identifiers. A first set of comments is selected where the user's identifier is included in the recipient identifiers of the corresponding comments, and a second set of comments is selected where the user's identifier is not included in the recipient identifiers of the corresponding comments. The word processor displays the first set of comments at their respective insertion points within the document content and does not display the second set of comments. In one embodiment, any comments that do not have recipient identifiers are viewable by anyone and, therefore, are included in the first set of comments.

In another embodiment, a group comment is included in the first set of comments. The group comment includes a group recipient identifier. Inclusion of the group comment in the first set of comments is performed by determining that the user identifier is included in a list of identifiers that correspond to the group recipient identifier. In a further embodiment, before displaying the group comment, the group comment is identified as being encrypted. A recipient package is retrieved that includes group encryption keys. A user encryption key is used to decrypt the recipient package, and the group encryption key that corresponds to the group comment is retrieved and used to decrypt the encrypted group comment.

In one embodiment, a first set of encrypted comments is identified as being included in the first set of comments. In order to open the encrypted comments, an encryption key is retrieved that corresponds to the user identifier. The encrypted comments are then decrypted using the retrieved encryption key. Note that encrypted comments included in the second set of comments cannot be decrypted using the user's encryption key because comments included in the second set of comments were not directed to the user that corresponds to the user identifier. In a further embodiment, encrypted comments are encrypted using a public encryption key that corresponds to the user identifier, and the encryption key that is used to decrypt the encrypted comment is a private encryption key that corresponds to the public encryption key.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
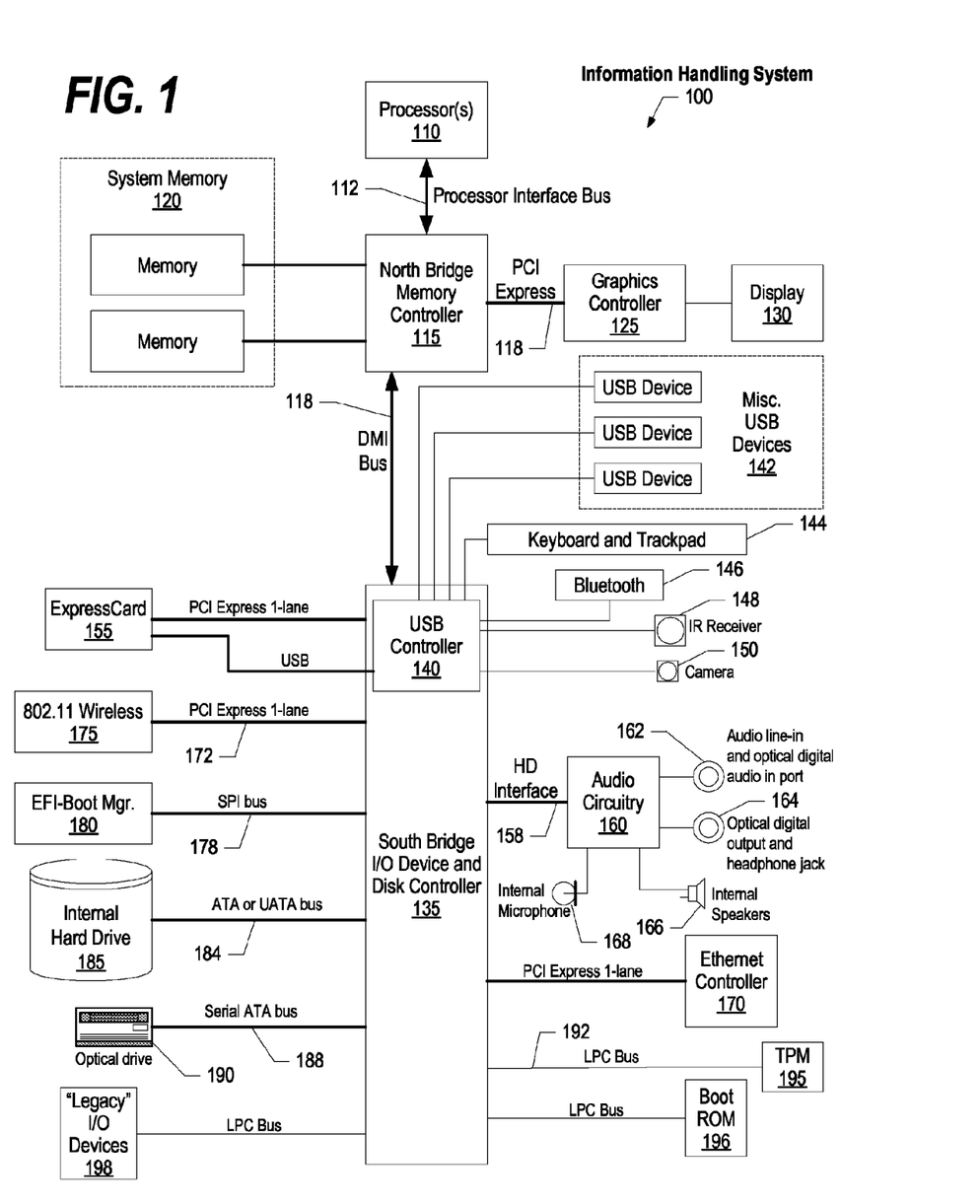
FIG. 1 is a block diagram of a data processing system in which the methods described herein can be implemented.
Figure 2:
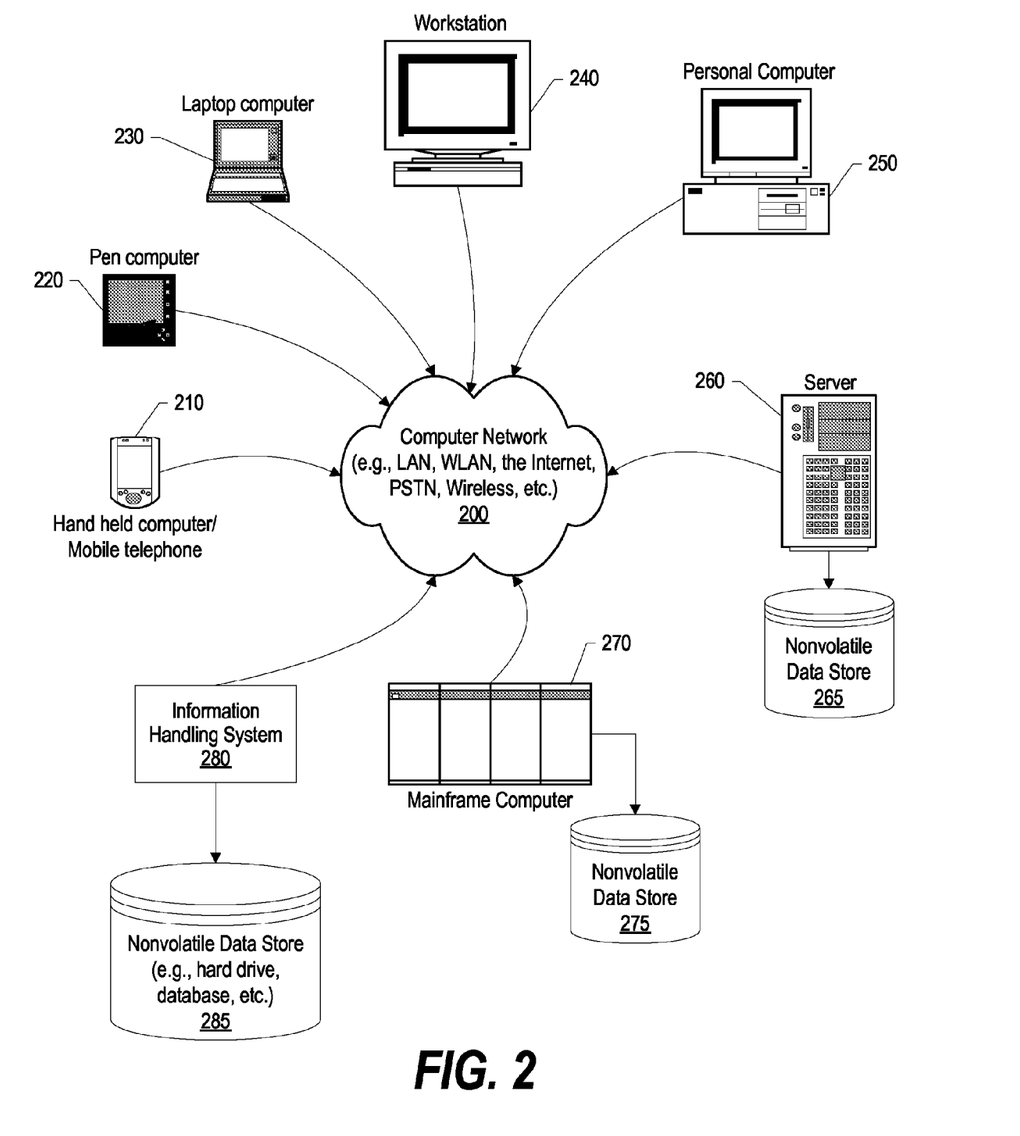
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

Figure 3:
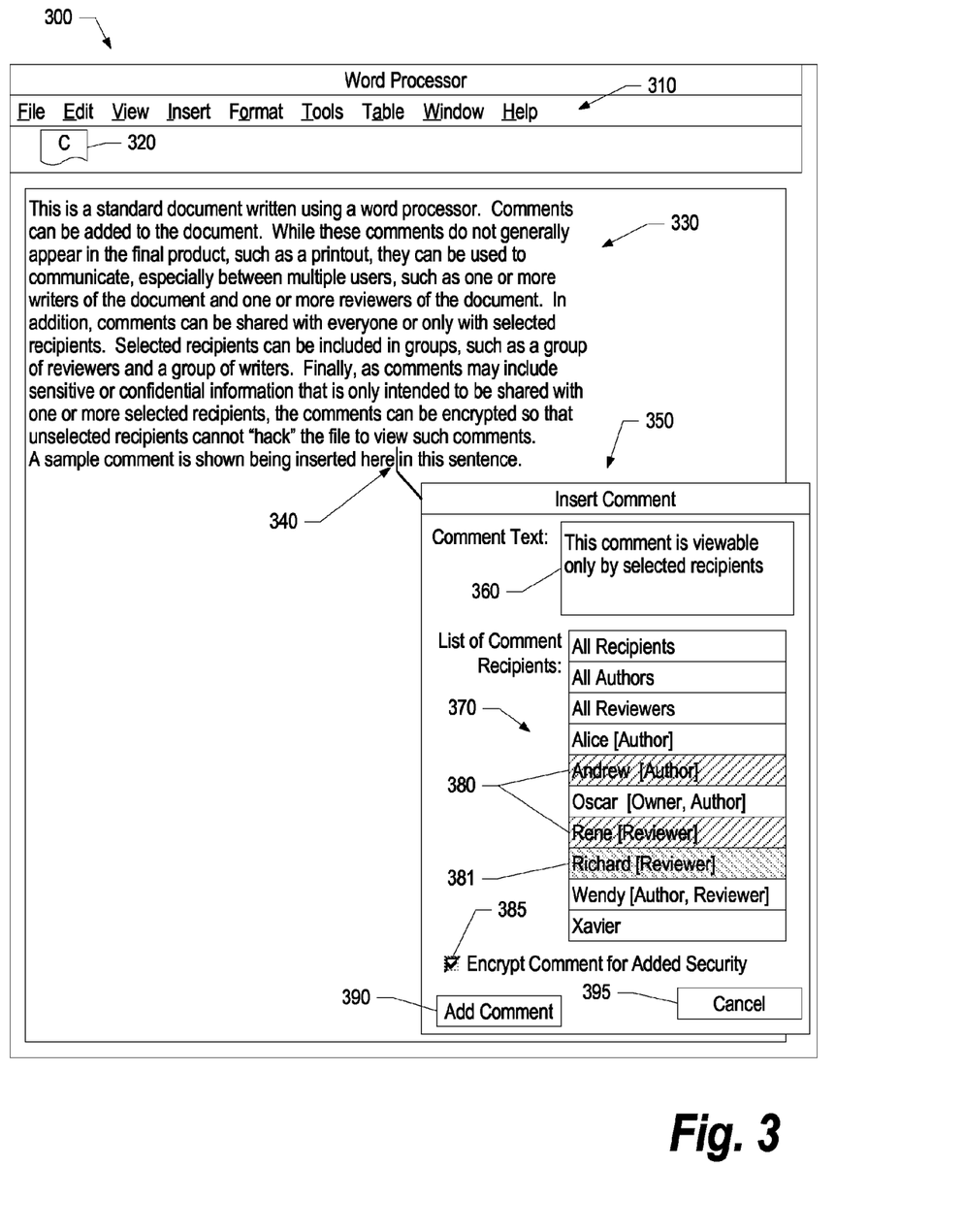
FIG. 3 is a screen depiction of a comment that is being inserted and directed to selected recipients.

FIG. 3 is a screen depiction of a comment that is being inserted and directed to selected recipients. FIG. 3 depicts word processing application 300 that includes menu bar 310 and comment button 320. Document content 330 is written using the word processor. Comments are added to the document upon request by the user of word processing application 300. In one embodiment, a visual icon, such as comment button 320 is used. As will be appreciated by those skilled in the art, many other means exist to request an action or operation by a word processing application, such as a keyboard action, a voice activated command, and the like. The user places the cursor at insertion point 340 where the comment is to be inserted and then requests the comment. While these comments do not generally appear in the final product, such as a printout, they can be used to communicate, especially between multiple users, such as one or more writers of the document and one or more reviewers of the document. In addition, comments can be shared with everyone or only with selected recipients. Selected recipients can be included in groups, such as a group of reviewers and a group of writers. Finally, as comments may include sensitive or confidential information that is only intended to be shared with one or more selected recipients, the comments can be encrypted so that unselected recipients cannot "hack" the file to view such comments. The selection of recipients is managed using comment insertion dialog window 350.

When the comment request (e.g., comment button 320) is selected, comment insertion dialog window 350 appears. Dialog window 350 includes various components that include comment content area 360 where the user types the comment, comment recipient selection area 370 where the user selects which recipients will be able to view the comment, encryption checkbox 385 that is selected when the user wants to encrypt the comment content so that other, non-selected recipients cannot hack the word processing document in order to view the comment content. In addition dialog window 350 includes add comment command button 390 and cancel command button 395. After the user has entered the comment content in comment content are 360 and selected one or more recipients from recipient selection area 370, then the user selects "add comment" command button in order to add the comment to the document at the insertion point. If the user decides not to add the comment, then the user can select "cancel" command button 395 to cancel the addition of the comment. In the example shown, the list of possible recipients includes various groups and individuals. The user is able to select multiple groups or individuals by using an input technique, such as pressing a keyboard key (e.g., the "control" key) while selecting the recipients using an input device such as a mouse or keyboard keys. In the example shown, selected recipients 380 include "Andrew" who is identified as an author of the document and "Rene" who is identified as a reviewer of the document. In one embodiment, the writer of the comment is automatically selected ("Richard" 381) so that the writer can continue to view the comment. As mentioned before, the list of possible recipients includes groups, such as "All Recipients," "All Authors," or "All Reviewers." These groups are simply examples and additional, or different, groups could be created and used based on the type of document. For example, recipient groups could include "managers," "employees," "vendors," and the like when a document pertains to an organization's structure or management.

Figure 4A:
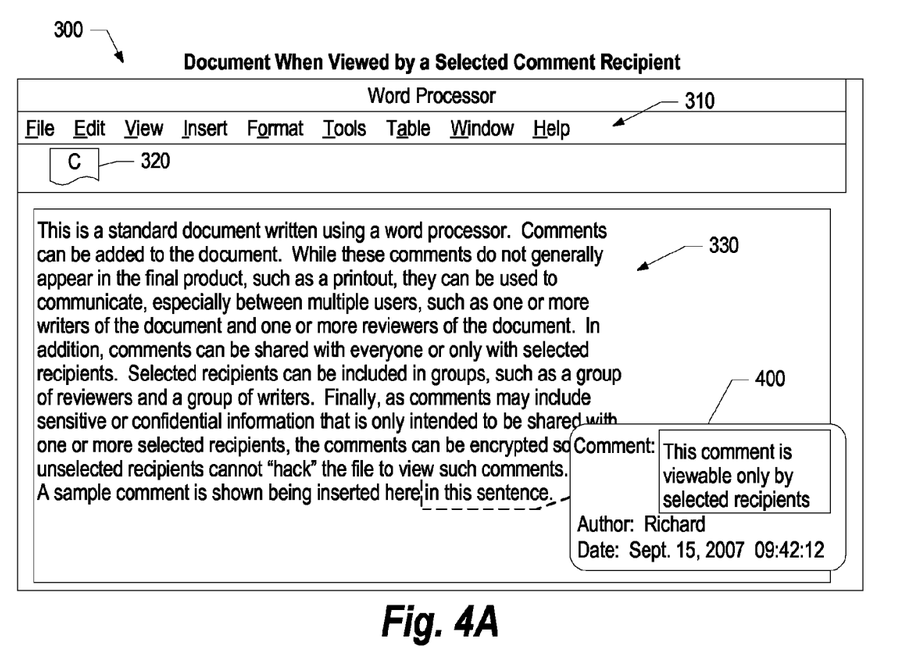
FIG. 4A is a screen depiction of the document with the comment inserted in FIG. 3 when it is viewed by one of the selected recipients.

FIG. 4A is a screen depiction of the document with the comment inserted in FIG. 3 when it is viewed by one of the selected recipients. When one of the selected recipients opens the document using word processor 300 with the comment, comment window 400 appears. Comment window 400 includes the comment content that was inserted as well as metadata corresponding to the comment. The metadata includes the author of the comment (in the example, the author is noted as being "Richard"), as well as a timestamp corresponding to when the comment was inserted.

Figure 4B:
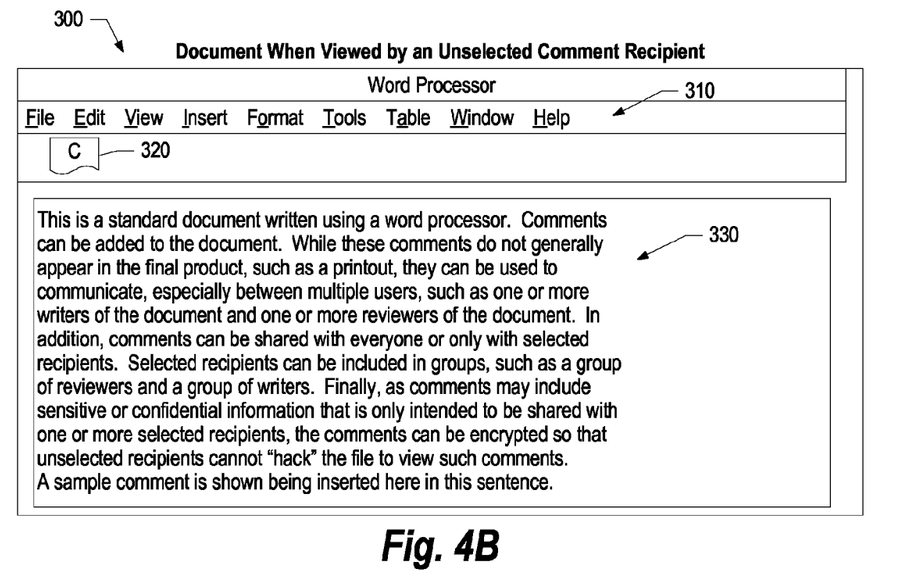
FIG. 4B is a screen depiction of the document with the comment inserted in FIG. 3 when it is viewed by a non-selected recipient.

FIG. 4B is a screen depiction of the document with the comment inserted in FIG. 3 when it is viewed by a non-selected recipient. In contrast to the view shown in FIG. 4A, in FIG. 4B the comment does not appear because the user of word processing application 300 is not one of the selected recipients. Using the sample names provided in FIG. 3, the word processing application shown in FIG. 4B is being operated by either "Alice," "Oscar," "Wendy," or "Xavier," as none of these individuals was selected as a recipient of the comment.

Figure 5:
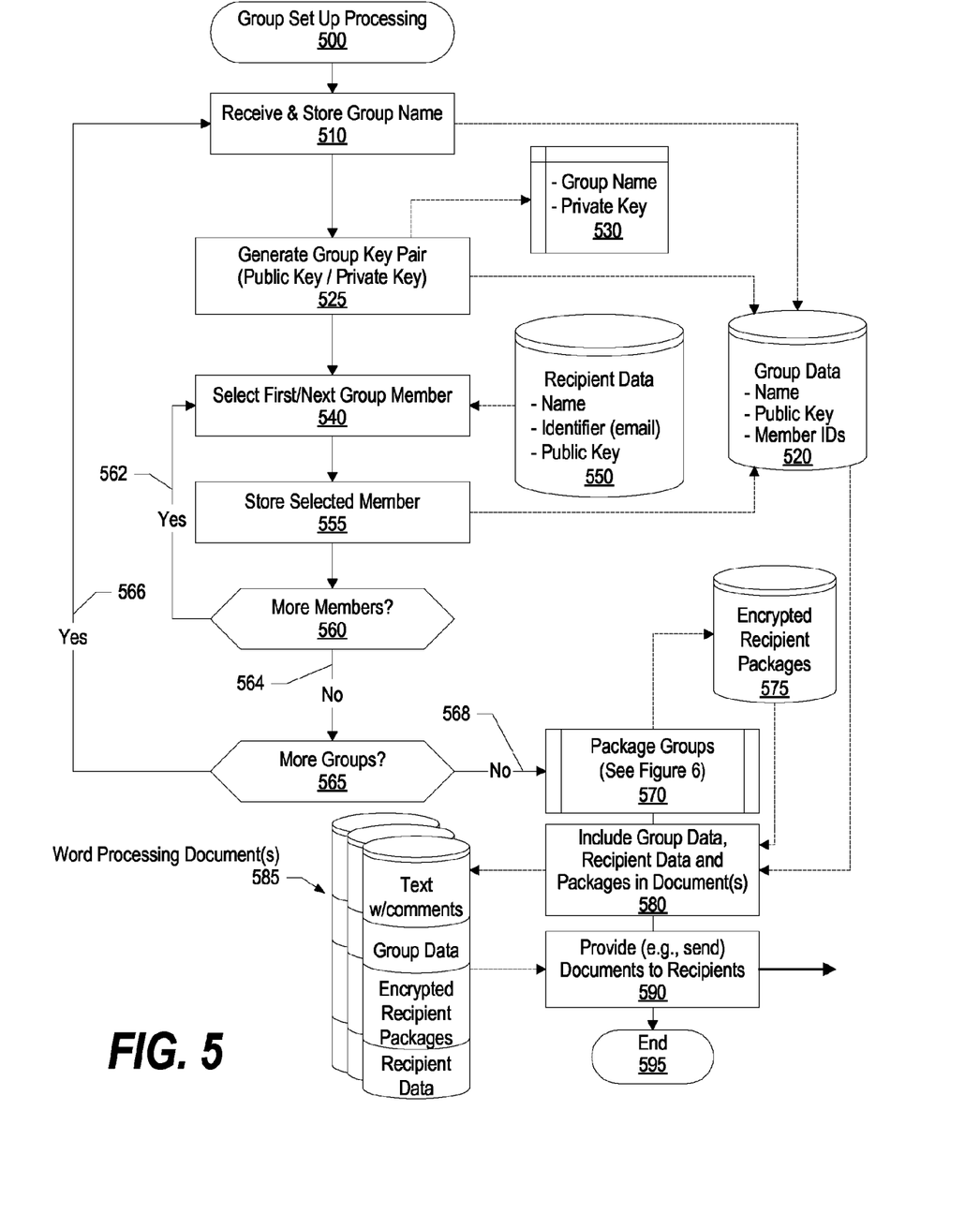
FIG. 5 is an exemplary flowchart showing steps used to set up groups of recipients.

FIG. 5 is an exemplary flowchart showing steps used to set up groups of recipients. Processing commences at 500 whereupon, at step 510, the system receives a group name (e.g., from a user) and stores the received group name in group data store 520. As shown, group data store 520 is used to store group names along with public keys associated with the respective groups as well as member (recipient) identifiers, such as user login identifiers or email addresses, that uniquely identify the members of each group. At step 525, an asymmetric public key/private key pair is generated for the group name that was received and stored in step 510. The public key is stored in group data store 520, while the private key is stored in private group storage 530 along with the respective group name. Now, a single group name is associated with a private key in private group storage 530 as well as a public key in public group data store 520.

At step 540, the first member (recipient) to include in the newly formed group is selected from recipient data store 550. As shown, recipient data store 550 includes the names of possible recipients, as well as the recipients' identifiers (e.g., user logins, email addresses, etc.). In addition, an asymmetric public key/private key pair has been generated for each recipient. The public key that corresponds to each recipient is associated with the respective recipients and is also stored in recipient data store 550. At step 555, the recipient identifier that was retrieved at step 540 is stored in group data store 520 and is associated with the group (or groups) to which the recipient belongs. Using the example from FIG. 3, Alice, Andrew, Oscar, and Wendy are all shown as being "authors" and would therefore be added to the "author" group for the document. Likewise, Rene, Richard, and Wendy are all shown as being "reviewers" and would therefore be added to the "reviewers" group for the document. Note that Wendy is included in both groups as she is noted as being both an author as well as a reviewer of the document. Also note that Xavier is not noted as being either an author or a reviewer of the document and would therefore not be included in either group. Returning to FIG. 5, after the selected recipient is stored at step 555, a determination is made as to whether there are more members to include in the group (decision 560). If there are more members to include, then decision 560 branches to "yes" branch 562 which loops back so that the user can select the next member (recipient) to include in the group and save the recipient's data accordingly. This looping continues until there are no more members to include in the selected group, at which point decision 560 branches to "no" branch 564 whereupon another determination is made as to whether there are more groups to create (decision 565). If there are more groups to create, then decision 565 branches to "yes" branch 566 which loops back to receive and store data regarding the next group, including the selection and storage of group members (individual recipients) to the group. This looping continues until the user is not creating any more groups, at which point decision 565 branches to "no" branch 568.

Figure 6:
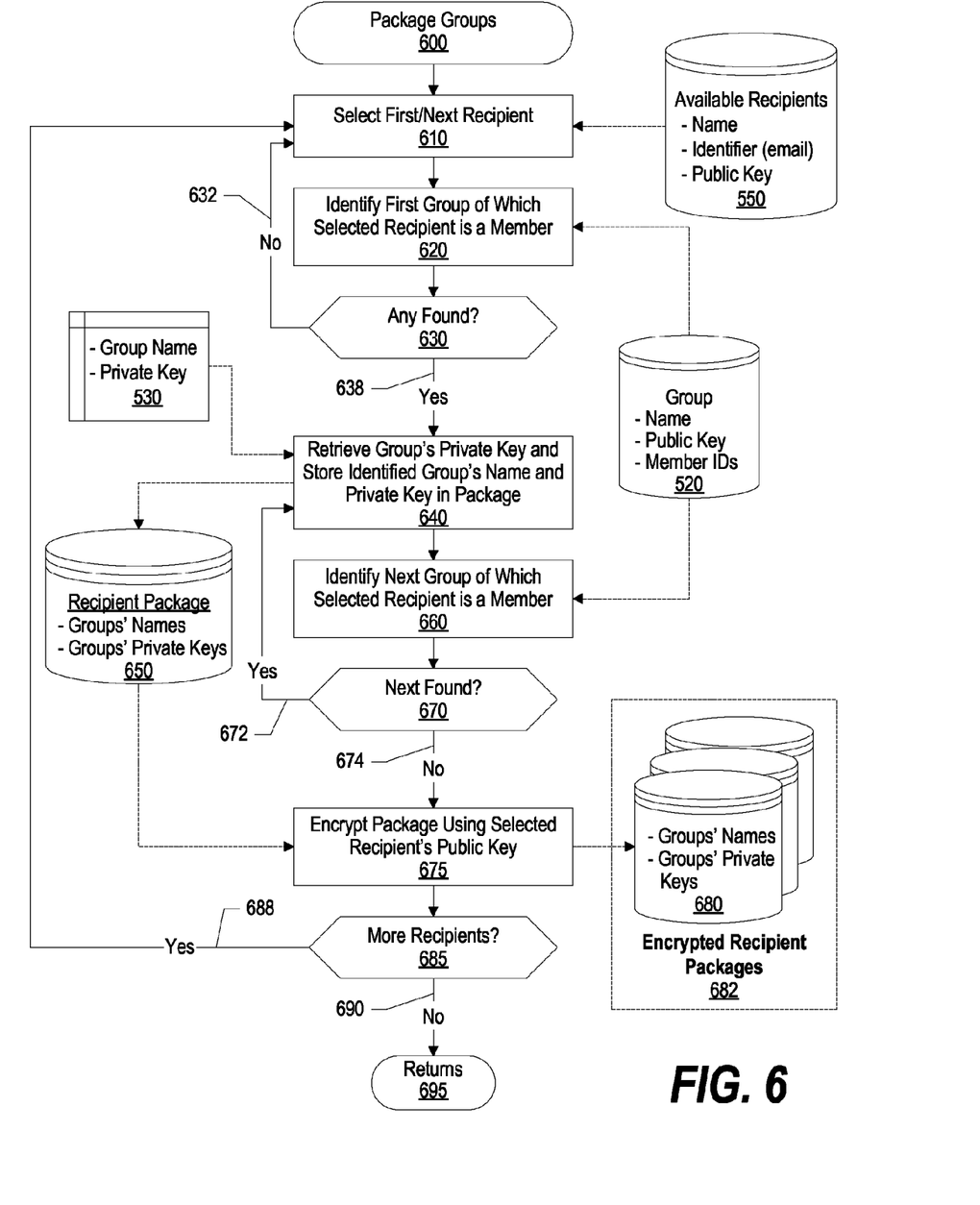
FIG. 6 is an exemplary flowchart showing steps used to package the various groups that were set up in FIG. 5.

After groups have been created and data regarding the groups have been stored, then the groups are packaged (predefined process 570, see FIG. 6 and corresponding text for processing details). The packaging of the groups results in one or more encrypted recipient packages 575 that can each only be opened by a particular recipient. At step 580, encrypted recipient packages 575 and group data store 520 are included in document(s) 585 that are associated with the recipients and groups. In one embodiment, document(s) 585 is created by appending the group data, the encrypted recipient packages, and the recipient data to the document that is to be commented upon. In this manner, the group data and recipient data needed to create and view comments directed at particular groups or individuals are kept together so that each user has access to all needed data when viewing or editing the document regardless of the user's location or access to centralized organizational data stores. At step 590 document(s) 585 are provided to the various recipients. The providing of the document can be accomplished using traditional methods such as storing the document on a shared nonvolatile data storage device, attaching the document to email messages and sending to the recipients via a network, such as the Internet, or other known methods. However, now that word processing document(s) 585 include the group data, the encrypted recipient packages, and the recipient data, comments included with the text that are directed to individual recipients and/or group(s) of recipients can be processed using the data included with the word processing documents, as well be further explained below. Processing thereafter ends at 595.

FIG. 6 is an exemplary flowchart showing steps used to package the various groups that were set up in FIG. 5. Processing commences at 600 whereupon, at step 610, the first recipient is selected from recipients data store 550. At step 620, the first group is identified from group data store 520 (using the recipient's identifier) that includes the selected recipient. A determination is made as to whether the selected recipient belongs to any groups (decision 630). If the selected recipient does not belong to any groups, then decision 630 branches to "no" branch 632 which loops back to select and process the next recipient from recipient data store 550. When a recipient is selected that belongs to at least one group, then decision 630 branches to "yes" branch 638 to create the recipient package.

At step 640, the group's private key and the group's name are retrieved from private group storage 530 and these are stored in recipient package 650. At step 660, an attempt is made to identify the next group that includes the selected recipient as a member. A determination is made as to whether a next group that includes the selected recipient as a member was identified (decision 670). If a next group was found, then decision 670 branches to "yes" branch 672 which loops back to retrieve the newly selected group's name and private key from private group storage 530 and store the retrieved name and private key in recipient package 650. This looping continues until all of the groups to which the selected recipient belongs have been identified and the groups' names and private keys are stored in the recipient's package. After all of the groups to which the selected recipient have been found and processed, decision 670 branches to "no" branch 674 whereupon, at step 675, the recipient's package (650) that was just created is encrypted using the recipient's public key resulting in encrypted recipient package 680.

A determination is then made as to whether there are more recipients in available recipients data store 550 to process (decision 685). If there are more recipients, then decision 685 branches to "yes" branch 688 which loops back to process the next recipient in the data store. For those recipients that are members of one or more groups, additional encrypted recipient packages 680 are created and added to the group of encrypted recipient packages 682. Encrypted recipient packages 682 are included with the word processing document and, because the individual encrypted recipient packages can only be opened with the recipients' private keys, the group keys stored in the encrypted packages are protected from unauthorized recipients or uses of the word processing document. After all recipients have been processed, decision 685 branches to "no" branch 690 and processing returns to the calling routine (see FIG. 5) at 695.

Figure 7:
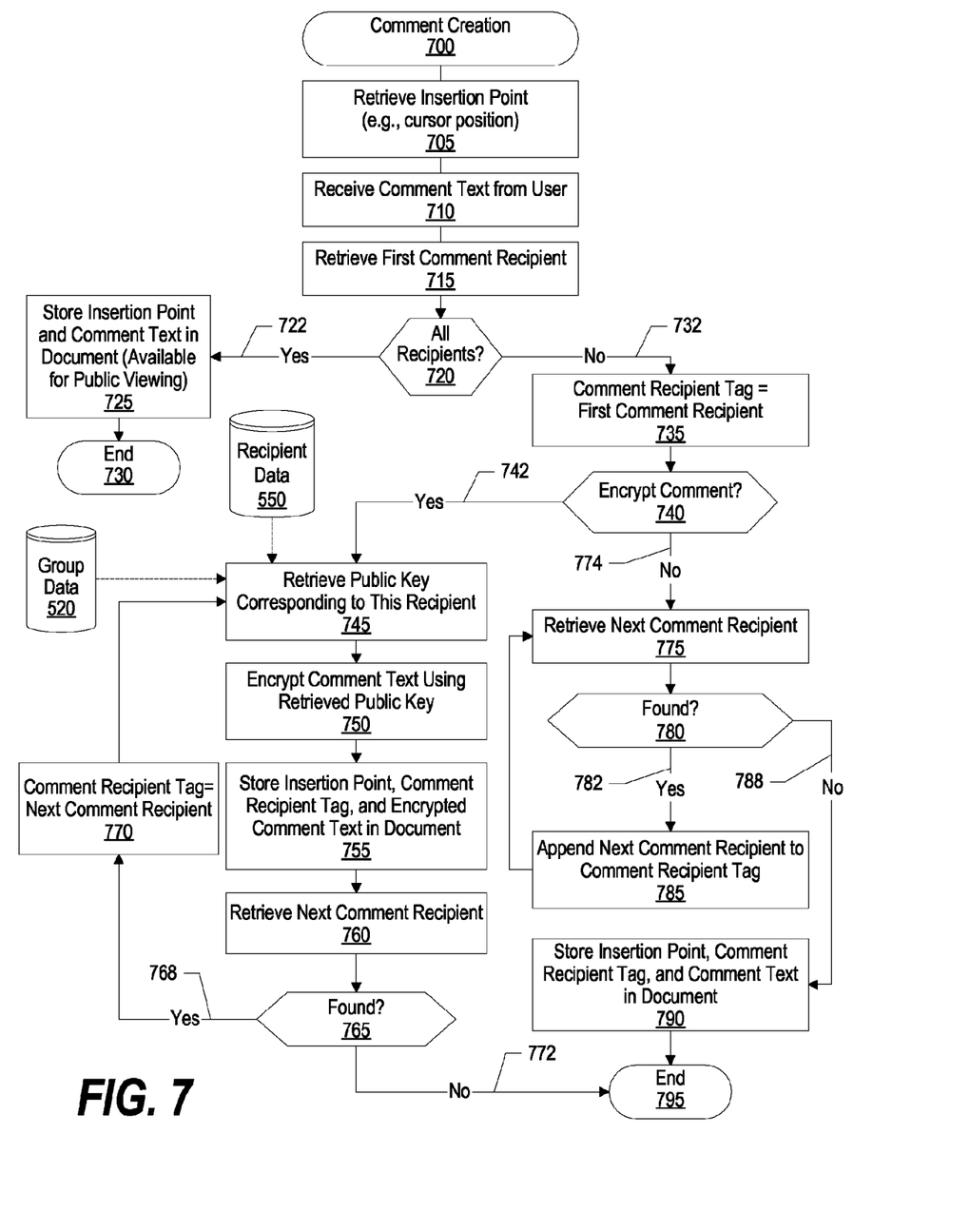
FIG. 7 is an exemplary flowchart showing steps used to create comments directed to particular recipients.

FIG. 7 is an exemplary flowchart showing steps used to create comments directed to particular recipients. Processing commences at 700 whereupon, at step 705, the comment insertion point within the document is retrieved. In one embodiment, the comment insertion point is the current position of the cursor within the document. At step 710, the comment content to be displayed at the insertion point is received from the user. At step 715, the first comment recipient is received from the user (e.g., selecting from a list of recipients such as recipient list 370 shown in FIG. 3). A determination is made as to whether the user has selected to have the comment visible to all recipients (decision 720). In one embodiment, it is determined that all recipients are the intended audience when either "All Recipients" has been selected (e.g., selecting "All Recipients" from a list of recipients such as recipient list 370 shown in FIG. 3), or when no specific recipients have been selected. If the determination is that all recipients have been selected, then decision 720 branches to "yes" branch 722 whereupon, at step 725, the insertion point is stored along with the comment content so that the comment content will be viewable by any recipient of the word processing document, and processing thereafter ends at 730.

Returning to decision 720, if all recipients have not been selected, then decision 720 branches to "no" branch 732 to process the various recipients. At step 735, the comment recipient tag that will be inserted in the document is initialized to be the first comment recipient's identifier. Note that each recipient can be either an individual recipient or a group of recipients. A determination is made as to whether the user requested that the comment be encrypted (decision 740). If the user requested that the comment be encrypted, then decision 740 branches to "yes" branch 742 whereupon, at step 745, the asymmetric "public" key that corresponds with this individual or group recipient is retrieved, either from recipient data store 550 (in the case of an individual recipient), or from group data store 520 (in the case of a group recipient). At step 750, the comment content is encrypted using the retrieved public key, and at step 755, the insertion point is stored along with the comment recipient tag and the encrypted comment content (e.g., comment content, graphic, multimedia, etc.) in the word processing document. At step 760, the next comment recipient (either an individual recipient or a group recipient) is retrieved from the list of recipients. A determination is made as to whether a next recipient was found in the list (decision 765). If another recipient is found, then decision 765 branches to "yes" branch 768 whereupon, at step 770, the comment recipient tag is reset to be the next comment recipient's identifier, and processing loops back to process this recipient (retrieving the recipient's public key, encrypting the comment content, and storing the data in the document). This looping continues until all recipients that were selected in the recipient list have been processed, at which point decision 765 branches to "no" branch 772 and encrypted comment creation processing ends at 795.

Returning to decision 740, if the comment is not being encrypted, then decision 740 branches to "no" branch 774 whereupon, at step 775, an attempt is made to retrieve a next comment recipient (group or individual) that was selected by the user from the list of recipients. A determination is made as to whether a next recipient was selected by the user (decision 780, i.e., whether a next recipient was found). If another selected recipient is found, then decision 780 branches to "yes" branch 782 whereupon, at step 785 the newly found recipient identifier (either group identifier or individual identifier) is appended to the comment recipient tag, and processing loops back to retrieve additional selected recipient identifiers. This looping continues until there are no more selected recipients to process, at which point decision 780 branches to "no" branch 788 whereupon, at step 790, the insertion point is stored along with the comment content so that the comment content will be viewable by any recipient whose identifier is included in the comment recipient tag. Unencrypted comment creation to selected recipients thereafter ends at 795.

Figure 8:
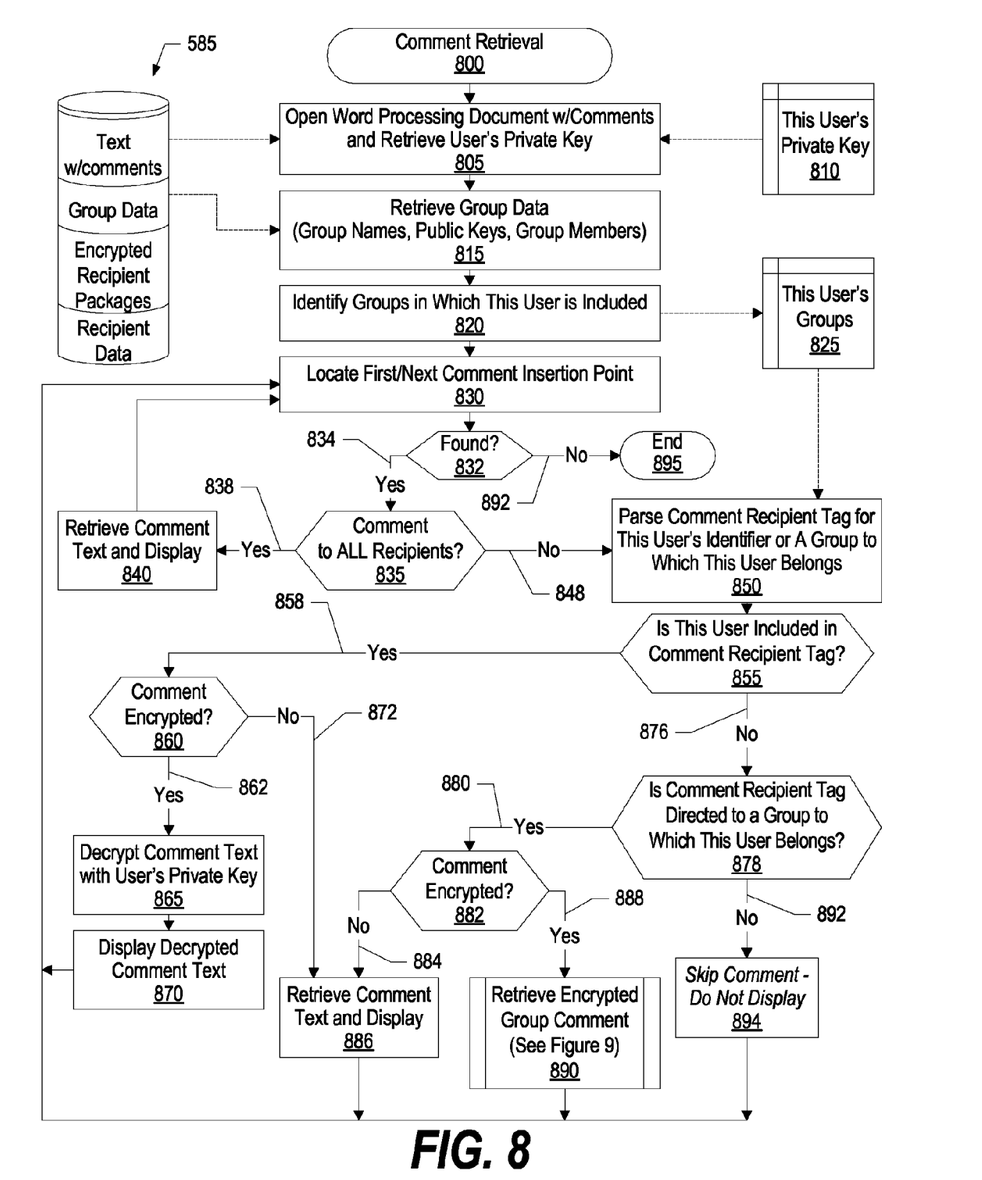
FIG. 8 is an exemplary flowchart showing steps used to retrieve comments from a document that are directed to selected recipients.

FIG. 8 is an exemplary flowchart showing steps used to retrieve comments from a document that are directed to selected recipients. Processing commences at 800 whereupon, at step 805, one of the recipients opens word processing document 585 with comments that have been inserted according to the present invention. Also, in step 805, the user's private key that is used to view encrypted comments is retrieved from user's storage 810. At step 815, group data is retrieved. In one embodiment, as previously illustrated in FIG. 6, each recipient that belongs to a group has an encrypted recipient package created for the respective recipient. Each of the encrypted recipient packages were encrypted using respective recipients' public key. In this embodiment, the group package that was created for this recipient is retrieved and decrypted using this recipient's private key that corresponds to the public key that was used to encrypt the recipient's group package. Inside the encrypted recipient group package are the group names (group identifiers) to which this recipient belongs as well as the private keys used to decrypt comments that have been directed to the group. For example, if this recipient is a member of the "authors" group, then inside this recipient's group package would be the group identifier (e.g., "Authors") along with the private encryption key that corresponds to the "Authors" group. When an encrypted comment is encountered that is directed to the recipient, or to one of the groups to which the recipient belongs, then the recipient's private key is used to decrypt comments directed to the recipient, and the group's private key is used to decrypt comments directed to one of the groups to which the recipient belongs. The group data portion of word processing document 585 includes the group names (identifiers) that have been established, the public encryption keys corresponding to each of the groups, and, in one embodiment, a list of the group members for each of the groups. At step 820, the groups to which this recipient belongs are identified and stored in storage area 825, such as a memory location.

At step 830, the text portion of the document, that includes comment data, is scanned in order to locate the first comment insertion point. A determination is made as to whether a comment insertion point is found in the document (decision 832). If a comment insertion point is found in the document, then decision 832 branches to "yes" branch 834 to process the comment that has just been found. A determination is made as to whether the comment is directed to all of the recipients of the document (decision 835). In one embodiment, it is determined that all recipients are the intended audience when either "All Recipients" has been selected (e.g., selecting "All Recipients" from a list of recipients such as recipient list 370 shown in FIG. 3), or when no specific recipients have been selected. If the comment is directed to all of the recipients of the document, then decision 835 branches to "yes" branch 838 whereupon, at step 840 the comment is retrieved and presented (e.g., displayed, etc.) to the recipient at the comment insertion point. Processing then loops back to locate the next comment insertion point in the document.

Returning to decision 835, if the comment is not directed to all recipients, then decision 835 branches to "no" branch 848 whereupon, at step 850, the comment recipient tag is parsed in order to determine if either the recipient's identifier is included in the comment recipient tag or if one of the group identifiers to which the recipient belongs is included in the comment recipient tag. A determination is made as to whether the user's identifier is included in the comment recipient tag (decision 855). If the user's identifier is included in the comment recipient tag, then decision 855 branches to "yes" branch 858 to process the comment. A determination is made as to whether the comment that is directed to the recipient is encrypted (decision 860). If the comment is encrypted, then decision 860 branches to "yes" branch 862 whereupon, at step 865, the comment content is decrypted using the recipient's private key that was retrieved in step 805. At step 870, the decrypted comment content is presented to the recipient at the comment insertion point. Processing then loops back to locate the next comment insertion point in the document. Returning to decision 860, if the comment that is directed to the recipient is not encrypted, then decision 860 branches to "no" branch 872 whereupon at step 886 the unencrypted comment content is presented to the recipient at the comment insertion point. Processing then loops back to locate the next comment insertion point in the document.

Returning to decision 855, if the user's identifier is not included in the comment recipient tag, then decision 855 branches to "no" branch 876 for further processing. A determination is made as to whether the comment recipient tag includes a group identifier to which the recipient belongs (decision 878). If the comment recipient tag includes a group identifier to which the recipient belongs, then decision 878 branches to "yes" branch 880 whereupon a determination is made as to whether the group-directed comment is encrypted (decision 882). If the group-directed comment is not encrypted, then decision 882 branches to "no" branch 884 whereupon, at step 886, the unencrypted comment content is presented to the recipient at the comment insertion point. Processing then loops back to locate the next comment insertion point in the document. On the other hand, if the group-directed comment is encrypted, then decision 882 branches to "yes" branch 888 whereupon, at predefined process 890, the encrypted group-directed comment is decrypted and presented to the user (see FIG. 9 and corresponding text for processing details). Processing then loops back to locate the next comment insertion point in the document.

Returning to decision 878, if the user does not belong to any of the groups that are included in the comment recipient tag, then decision 878 branches to "no" branch 892 whereupon, at 894, the comment is skipped and not presented to the user. Processing then loops back to locate the next comment insertion point in the document.

The processing described above continues locating comments in word processing document 585 until there are no more comments to process. When all of the comments have been processed, decision 832 branches to "no" branch 892 and processing ends at 895.

Figure 9:
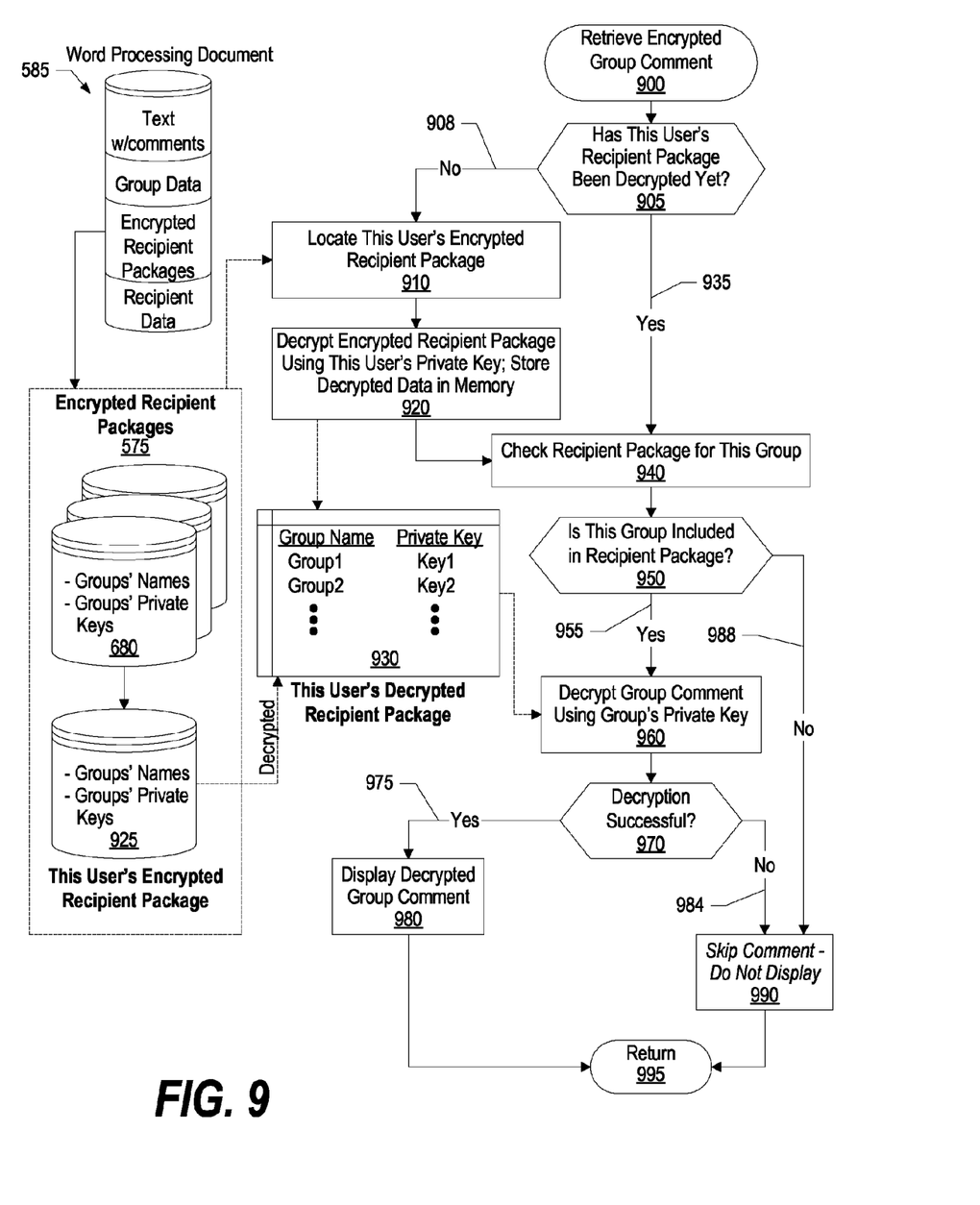
FIG. 9 is an exemplary flowchart showing steps to retrieve an encrypted comment that is directed to a group of recipients.

FIG. 9 is an exemplary flowchart showing steps to retrieve an encrypted comment that is directed to a group of recipients. Processing commences at 900 whereupon a determination is made as to whether this user's recipient package has been decrypted. If the user's recipient package has not yet been decrypted, then decision 905 branches to "no" branch 908 whereupon, at step 910, this user's encrypted recipient package 925 is located in document 585. In one embodiment, the user's encrypted recipient package is tagged with the recipient's identifier. Once located, at step 920, the user's encrypted recipient package is decrypted using the user's private key and the decrypted group data is stored in a memory area as decrypted recipient package 930. Returning to decision 905, if the user's recipient package has already been decrypted, then decision 905 branches to "yes" branch 935 bypassing steps 910 and 920.

At step 940, the decrypted recipient package is searched for the group identifier that was found in the comment recipient tag. A determination is made as to whether this group is one of the groups listed in decrypted recipient package 930 (decision 950). If this group is one of the groups listed in decrypted recipient package 930, then decision 950 branches to "yes" branch 955 whereupon, at step 960, the encrypted group-directed comment is decrypted using the group's private key that corresponds to this group and was retrieved from the user's decrypted recipient package 930. A determination is made as to whether the decryption of the group comment was successful using the retrieved group private key (decision 970). If the decryption was successful, then decision 970 branches to "yes" branch 975 whereupon, at step 980, the decrypted group comment is presented to the recipient at the comment insertion point and processing returns to the calling routine (e.g., FIG. 8) at 995. On the other hand, if the decryption was unsuccessful, then decision 970 branches to "no" branch 984 whereupon, at 990, the comment is skipped and not presented to the user, and at 995 processing returns to the calling routine. Returning to decision 950, if this group is not one of the groups listed in decrypted recipient package 930, then decision 950 branches to "no" branch 988 whereupon, at 990, the comment is skipped and not presented to the user, and at 995 processing returns to the calling routine.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   opening a word processing document that includes document content and a plurality of comments inserted at a plurality of insertion points within the document content, wherein the opening occurs during a word processing application currently assigned to a user identifier, and wherein one or more of the plurality of comments includes one or more recipient identifiers;
   selecting a first set of comments from the plurality of comments where the user identifier is included in the recipient identifiers of the corresponding comments;
   identifying a first set of one or more encrypted comments included in the first set of comments;
   retrieving a user encryption key corresponding to the user identifier;
   decrypting the first set of encrypted comments using the retrieved user encryption key;

selecting a second set of comments from the plurality of comments where the user identifier is not included in the recipient identifiers of the corresponding comments;

displaying the first set of comments, each of the first set of comments being displayed at their respective insertion points within the document content; and inhibiting display of the second set of comments.

2. The method of claim 1 wherein at least one of the plurality of comments that does not include one or more recipient identifiers is included in the first set of comments.

3. The method of claim 1 wherein a group comment is included in the first set of comments, wherein the group comment includes a group recipient identifier and wherein the selecting of the first set of comments further comprises:

determining that the user identifier is included in a list of identifiers corresponding to the group recipient identifier.

4. The method of claim 3 further comprising:

prior to displaying the group comment:
  determining that the group comment is encrypted;
  in response to determining that the group comment is encrypted:
    locating an encrypted recipient package corresponding to the user identifier, wherein the recipient package includes one or more group encryption keys;
    decrypting the encrypted recipient package using the retrieved user encryption key;
    retrieving a selected group encryption key from the decrypted recipient package, wherein the selected group encryption key corresponds to the group recipient identifier; and
    decrypting the encrypted group comment using the selected group encryption key.

5. The method of claim 1 wherein a second set of one or more encrypted comments is included in the second set of comments, and wherein the retrieved user encryption key is unable to decrypt the second set of encrypted comments.

6. The method of claim 1 wherein at least one of the encrypted comments selected from the first set of encrypted comments was encrypted using a public encryption key that corresponds to the user identifier, and wherein the retrieved user encryption key used to decrypt the selected encrypted comment is a private encryption key that corresponds to the public encryption key.

7. A information handling system comprising:

one or more processors;

a memory accessible by at least one of the processors;

a nonvolatile storage area accessible by at least one of the processors;

a set of instructions stored in the memory and executed by at least one of the processors in order to perform actions of:

opening a word processing document that includes document content and a plurality of comments inserted at a plurality of insertion points within the document content, wherein the opening occurs during a word processing application currently assigned to a user identifier, and wherein one or more of the plurality of comments includes one or more recipient identifiers;

selecting a first set of comments from the plurality of comments where the user identifier is included in the recipient identifiers of the corresponding comments;

identifying a first set of one or more encrypted comments included in the first set of comments;

retrieving a user encryption key corresponding to the user identifier;

decrypting the first set of encrypted comments using the retrieved user encryption key;

selecting a second set of comments from the plurality of comments where the user identifier is not included in the recipient identifiers of the corresponding comments;

displaying the first set of comments, each of the first set of comments being displayed at their respective insertion points within the document content; and inhibiting display of the second set of comments.

8. The information handling system of claim 7 wherein at least one of the plurality of comments that does not include one or more recipient identifiers is included in the first set of comments.

9. The information handling system of claim 7 wherein a group comment is included in the first set of comments, wherein the group comment includes a group recipient identifier and wherein the selecting of the first set of comments further comprises additional instructions that, when executed, cause at least one of the processors to perform further actions comprising:

determining that the user identifier is included in a list of identifiers corresponding to the group recipient identifier.

10. The information handling system of claim 9 wherein the set of instructions, when executed, cause at least one of the processors to perform further actions comprising:

prior to displaying the group comment:
  determining that the group comment is encrypted;
  in response to determining that the group comment is encrypted:
    locating an encrypted recipient package corresponding to the user identifier, wherein the recipient package includes one or more group encryption keys;
    decrypting the encrypted recipient package using the retrieved user encryption key;
    retrieving a selected group encryption key from the decrypted recipient package, wherein the selected group encryption key corresponds to the group recipient identifier; and
    decrypting the encrypted group comment using the selected group encryption key.

11. The information handling system of claim 7 wherein at least one of the encrypted comments selected from the first set of encrypted comments was encrypted using a public encryption key that corresponds to the user identifier, and wherein the retrieved user encryption key used to decrypt the selected encrypted comment is a private encryption key that corresponds to the public encryption key.

12. A computer program product stored in a non-transitory computer readable medium, comprising functional descriptive material that, when executed by an information handling system, causes the information handling system to perform actions that include:

opening a word processing document that includes document content and a plurality of comments inserted at a plurality of insertion points within the document content, wherein the opening occurs during a word processing application currently assigned to a user identifier, and wherein one or more of the plurality of comments includes one or more recipient identifiers;

selecting a first set of comments from the plurality of comments where the user identifier is included in the recipient identifiers of the corresponding comments;

identifying a first set of one or more encrypted comments included in the first set of comments;

retrieving a user encryption key corresponding to the user identifier;

decrypting the first set of encrypted comments using the retrieved user encryption key;

selecting a second set of comments from the plurality of comments where the user identifier is not included in the recipient identifiers of the corresponding comments;

displaying the first set of comments, each of the first set of comments being displayed at their respective insertion points within the document content; and inhibiting display of the second set of comments.

13. The computer program product of claim 12 wherein at least one of the plurality of comments that does not include one or more recipient identifiers is included in the first set of comments.

14. The computer program product of claim 12 wherein a group comment is included in the first set of comments, wherein the group comment includes a group recipient identifier and wherein the selecting of the first set of comments further comprises additional functional descriptive material that causes the data processing system to perform additional actions that include:

determining that the user identifier is included in a list of identifiers corresponding to the group recipient identifier.

15. The computer program product of claim 14 further comprising functional descriptive material that causes the data processing system to perform additional actions that include:

prior to displaying the group comment:
determining that the group comment is encrypted;
in response to determining that the group comment is encrypted:
locating an encrypted recipient package corresponding to the user identifier, wherein the recipient package includes one or more group encryption keys;
decrypting the encrypted recipient package using the retrieved user encryption key;
retrieving a selected group encryption key from the decrypted recipient package, wherein the selected group encryption key corresponds to the group recipient identifier; and
decrypting the encrypted group comment using the selected group encryption key.

16. The computer program product of claim 12 wherein a second set of one or more encrypted comments is included in the second set of comments, and wherein the retrieved user encryption key is unable to decrypt the second set of encrypted comments.

17. The computer program product of claim 12 wherein at least one of the encrypted comments selected from the first set of encrypted comments was encrypted using a public encryption key that corresponds to the user identifier, and wherein the retrieved user encryption key used to decrypt the selected encrypted comment is a private encryption key that corresponds to the public encryption key.

* * * * *